(12) United States Patent
Stacey et al.

(10) Patent No.: US 6,834,053 B1
(45) Date of Patent: Dec. 21, 2004

(54) DISTRIBUTED TRAFFIC SCHEDULER

(75) Inventors: Dave Stacey, Stansted Abbotts (GB); Fai Tsang, South Woodham Ferrers (GB); Simon Brueckheimer, London (GB)

(73) Assignee: Nortel Networks Limited, St. Laurent (CA)

( * ) Notice: Subject to any disclaimer, the term of this patent is extended or adjusted under 35 U.S.C. 154(b) by 695 days.

(21) Appl. No.: 09/698,799

(22) Filed: Oct. 27, 2000

(51) Int. Cl.[7] .................. H04L 12/28; H04L 12/56
(52) U.S. Cl. .................. 370/395.4; 395/395.43; 395/493
(58) Field of Search .................. 370/229, 230, 370/231, 235, 395.1, 395.43, 395.6, 395.61, 395.64, 395.65, 445, 395.4, 395.41, 395.42, 395.5, 493

(56) References Cited

U.S. PATENT DOCUMENTS

| | | | |
|---|---|---|---|
| 5,802,051 A | * | 9/1998 | Petersen et al. ....... 370/395.42 |
| 5,835,494 A | * | 11/1998 | Hughes et al. ............ 370/397 |
| 6,169,738 B1 | * | 1/2001 | Sriram et al. .......... 370/395.21 |
| 6,219,339 B1 | * | 4/2001 | Doshi et al. ................ 370/235 |
| 6,272,109 B1 | * | 8/2001 | Pei et al. .................... 370/230 |
| 6,392,994 B1 | * | 5/2002 | Dubuc ........................ 370/230 |
| 6,501,731 B1 | * | 12/2002 | Chong et al. ............ 370/230.1 |
| 6,538,992 B1 | * | 3/2003 | Subbiah et al. ............. 370/230 |
| 6,560,230 B1 | * | 5/2003 | Li et al. ................. 370/395.42 |

* cited by examiner

*Primary Examiner*—Ajit Patel
*Assistant Examiner*—Chirag Shah
(74) *Attorney, Agent, or Firm*—Barnes & Thornburg, LLP

(57) ABSTRACT

A traffic scheduler controls despatch of assembled packets or cells at an adaptation interface of an asynchronous transfer mode (ATM) network supporting a plurality of ATM traffic classes on two or more ATM adaptation layers. The scheduler comprising a distributed hierarchy of individual traffic schedulers one or more at each layer of the hierarchy each dedicated to its own traffic class. An aggregate traffic output at one layer in the hierarchy forms an input to the next layer. The lower level layers of the hierarchy are incorporated in a common part sublayer device and provide feedback to higher layers to control the flow of traffic during periods of congestion.

25 Claims, 4 Drawing Sheets

DISTRIBUTED TRAFFIC SCHEDULER

FIELD OF THE INVENTION

This invention relates to traffic scheduling and congestion monitoring in an ATM network.

BACKGROUND OF THE INVENTION

The services that are carried in today's telecommunications network can be categorised into two main types; real time and non-real time services. The typical examples of these two types are respectively voice telephony and computer data. The two services have very different characteristics and requirements and therefore have traditionally been carried over disjoint network technologies. However to increase flexibility and to decrease costs, there is a major drive by PTTs and network operators to integrate real-time and non-real time services within one homogeneous network. The asynchronous transfer mode (ATM) has been specifically designed to enable this common transport.

A key component of ATM is the adaptation function. This provides the mechanism that adapts the carried service to and from the ATM domain. Several adaptation layers have so far been defined to accommodate the various traffic types that may be transported. For example, ATM Adaptation Layer 1 (AAL1) is designed to adapt constant bit rate services (predominately voice or video) into fixed length ATM cells. A feature of AAL1 is that it enables the timing relationship between the transmitter and receiver to be maintained over the asynchronous network. In contrast, ATM Adaptation Layer 5 (AAL5) has been designed predominantly to support data services. As such it provides a mechanism to segment long data packets into fixed length ATM cells and also provides a mechanism to enable the integrity of the reassembled data packet to be validated after transmission across the network. AAL5 is also being used in certain applications to carry voice services (particularly in computer desktop applications) where AAL5 technology is readily available.

Both AAL1 and AAL5 adapt the carried service into a stream of fixed length ATM cell payloads. However for certain compressed voice services, the length of the standard ATM cell payload (48 bytes) is too large and its use would lead to a large packetisation delay that in turn would affect existing network delay budgets and provide acceptable voice characteristics. To resolve this problem ATM Adaptation :Layer 2 (AAL2) has been defined. AAL2 supports a multiplex of user channels within a single virtual channel connection (VCC). Each user channel is carried in a stream of mini-packets. The length of the mini-packet payload for each channel can be defined according to the packetisation delay that can be tolerated. AAL2 differs from AAL1 and AAL5 in two ways. Firstly it enables a single VCC to support multiple diverse services (a number of simultaneous voice, video and data channels can be multiplexed together to reduce packetisation delay), and secondly it introduces a new switching layer above the ATM layer (i.e. the function of switching a mini-packet connection from one AAL2 VCC to another AAL2 VCC).

To support the full range of telecommunication services operators need to provide these three adaptation layers in an efficient manner. There also needs to be a mechanism to enable the interworking between services carried over different adaptation layers (for example to enable a PSTN user carried via AAL1 to communicate with a desktop voice user hose computer only supports AAL5). To increase flexibility further and to scale networks there is also a requirement to support AAL2 switching. This has introduced problems with the design and efficient operation of ATM schedulers. The purpose of a scheduler is to despatch ATM cells into the network at a controlled rate which minimises congestion and maximises the efficient use of the network resources. The need to handle numerous queues of different traffic classes supported on different ATM adaptation layers has made scheduling a complex and difficult operation.

By way of background, there follows an outline summary of the main ATM traffic classes currently in use.

ATM Traffic Classes

To accommodate the differing behaviours and QoS requirements for a variety of traffic sources, a set of traffic classes is defined in ATM. Each traffic class is designed to describe the characteristics and requirements of a particular type of voice or data service. Five traffic classes have been defined by the ATM Forum [ATMF TM4]-CBR, rt-VBR, nrt-VBR, ABR and UBR.

CBR

The CBR (constant bit rate) traffic class has been designed to support periodic traffic sources that have real-time requirements (i.e. they are delay sensitive). The traffic contract for a CBR connection is entirely specified by its Peak Cell Rate (PCR). The PCR specifies the peak emission rate of ATM cells (and thus implicitly the period between successive cells). All cells within the connection should conform to the PCR. Although the connection is described as CBR, it is perfectly admissible to transmit cells at lower than the PCR, or even to halt emission entirely.

Since the class is real-time, the ATM network commits to delivering cells within a specified delay and jitter bound (CTD and CDV).

rt-VBR

The real-time VBR (variable bit rate) class has been defined to support variable rate real time services (such as certain video streams). A rt-VBR connection is specified in terms of its Sustained Cell Rate (SCR), its Maximum Burst Size (MBS) and its PCR. The SCR defines the mean rate of the connection, the PCR defines the peak rate of any burst and the MBS defines the relationship between the two. Again, as this is a real time connection, the ATM network commits to delivering the service to specified delay and jitter bounds.

nrt-VBR

Specified in an equivalent manner to rt-VBR (PCR, SCR and MBS) this class is provided for the non real-time delivery of delay insensitive variable rate services. There is no delay or jitter commitment made by the ATM network for the delivery of this service.

ABR

In ABR (available bit rate) the source varies its bandwidth usage in accordance to current network congestion which is signalled either implicitly or explicitly through the use of Resource Management (RM) cells.

The key parameters of an ABR connection include:

PCR—peak cell rate

MCR—minimum cell rate (can be zero)

ICR—initial cell rate (start-up rate)

ACR—actual cell rate

CDF—Cell Decrease Factor

CIF—Cell Increase Factor

CRM—missing RM cell count

The connection source transmits two types of cells: data cells and RM cells. The RM cells are transmitted to the receiver where they are looped back to the transmitter. In either direction, each node within the connection can signal its congestion state by inserting information into the RM cell (additionally each intermediate node in the connection can also generate its own RM cells).

The source monitors for the return of the RM cell and changes its connection rate according to the congestion indications contained within it (congestion can be either implicitly or explicitly defined). The RM cells can be sent either as part of the current, contracted rate (set by the ACR—in which case CLP=0) or additionally out-of-rate RM cells can also be sent (CLP=1) at a default rate no greater than 10 per second.

The source uses the following procedure to dictate its behaviour:

On start-up set the ACR to ICR (default PCR)

The first cell sent is always a Forward_RM (which includes an indication of the ACR) at each cell transmission interval send either a:

forward_RM (i.e a RM initiated by the source) if no forward_RM cells have been sent either within a pre-determined time limit (default 100 ms) or a pre-determined number of cell events (default 32 cells)

or send a backward_RM (i.e a RM initiated at the far-end that is being 'turned around' by the source) if there is a backward_RM waiting to be sent AND a backward_RM has-not been sent since the last forward_RM was sent OR there is no data cell waiting or else send a data cell (if one exists)

prior to sending the forward_RM the new ACR rate is computed:

if no forward_RM has been sent since a specified time (the ACR Decrease Time Factor (ADTF)–default value 0.5 seconds) then the ACR=ICR if no backward_RM has been received from the end-station since the last CRM (default 500 k) forward_RM cells then the ACR=min(ACR−ACR*CDF, MCR) where the CDF is the Cutoff-Decrease-Factor–its default value is 1/16.

when a backward_RM is received (i.e a RM that has looped fully around the connection) the source must adjust its rate if the backward_RM has a congestion indication (CI=1) then the ACR=min(ACR−ACR*RDF, MCR) RDF is the Rate-Decrease-Factor, default 1/16.

if backward_RM has no increase set (NI=1) then ACR= ACR else ACR=max(ACR+PCR*RIF, PCR)—where RIF is the Rate-Increase-Factor–default 1/16.

At the receiving station the receiver monitors for RM cells and loops them back. The receiver uses the following procedure:

For received data cells monitor the EFCI (Explicit Forward Congestion Indication) bit When a forward_RM is received turn-it-around. Generally all fields remain unchanged (except the direction and the BN field which is reset to indicate that the RM cell came from the end station.)

However if the saved EFCI state is set, then the Congestion Indication bit is set, or if internally the receiver is experiencing congestion it can also set the CI/NI bits or define an Explicit Rate the backward RM can be sent either in-rate or out-rate, generally old RM cells still awaiting scheduling are over-written by newer RM cells Each switch within the connection must implement one or more of several congestion monitoring techniques (including EFCI marking of data cells; relative rate marking via the CI/NI bits in the RM cells, explicit rate marking via the ER field in the RM, or Virtual Source/Virtual Destination Control—whereby the control loop is segmented into a number of sections). Switches may also generate there own backward_RM cells (no more than 10/sec)—these are always used to indicate congestion.

UBR

The UBR (unspecified bit rate) service is intended for non real time applications. As its name implies there is no commitment from the network to either the delay or loss bounds for services that utilise this contract. Any congestion control for UBR services must be performed at a higher layer (e.g. application layer) on an end-to-end basis. It is optional for a UBR service whether to specify a PCR. If it is specified then the user may transmit at any rate up to the PCR.

There is a general need to provide a functional partitioning of an adaptation layer technology that enables the interworking requirements to be met with the flexibility to carry a call in any of the standard ATM adaptation layers. Further, a partitioning is required that advantageously enables a number of usable adaptation technology layer modes to be configured from the set of basic building blocks. These modes include trunking between the ATM domain and the legacy carrier domain; interworking between ATM connections (either using the same or a differing adaptation layer) and switching (AAL2). It is further desirable that this partitioning should be scalable such that a range of adaptation capacities can be configured to match the transmission interfaces of the SDH using the set of basic adaptation building blocks. A key requirement of any adaptation layer partitioning is that it optimises buffering apportionment in order to minimise the delay through any system and to minimise the memory and hence cost requirements of any implementation.

As discussed above, a particular problem in designing a network capable of handling these various traffic types and adaptation layers is that of providing, at the adaptation interface to the ATM network, an efficient packet scheduler that can launch assembled packets or cells into the network in a controlled and efficient manner and can meet the various quality of service requirements for those packets or cells.

SUMMARY OF THE INVENTION

An object of the invention is to minimise or to overcome the above disadvantage.

A further object of the invention is to provide an improved method and apparatus for ATM packet scheduling.

According to a first aspect of the invention, there is provided a packet scheduler for controlling dispatch of assembled packets at an adaptation interface of an asynchronous (ATM) network, the scheduler being distributed over a common part sublayer device, one or more service specific sublayer devices and an ATM network device so as to be capable of scheduling between said traffic classes in an optimum manner.

According to a further aspect of the invention, there is provided a scheduler for controlling despatch of assembled packets or cells at an adaptation interface of an asynchronous transfer mode (ATM) network supporting a plurality of ATM traffic classes on two or more ATM adaptation layers, the scheduler being distributed over a common part sublayer device, one or more service specific sublayer devices and an ATM network device so as to be capable of scheduling between said traffic classes in an optimum manner According to a further aspect of the invention, there is provided a traffic scheduler for controlling despatch of assembled packets or cells at an adaptation interface of an asynchronous transfer mode (ATM) network supporting a plurality of ATM traffic classes on two or more ATM adaptation layers, the scheduler comprising a distributed hierarchy of individual traffic schedulers one or more at each layer of the hierarchy, wherein each individual scheduler is tuned to respective layer and traffic source characteristics, and wherein an aggregate traffic output at one layer in the hierarchy forms an input to the next layer.

Advantageously, lower-level layers provide feedback to higher layers to control the flow of traffic during periods of congestion. The congestion may be resolved by discarding non-priority packets and by stopping selected individual schedulers.

According to another aspect of the invention, there is provided a method of scheduling despatch of assembled packets or cells at an adaptation interface of an asynchronous transfer mode (ATM) network supporting a plurality of ATM traffic classes on two or more ATM adaptation layers, said method comprising scheduling each said traffic class individually via a traffic scheduler distributed over said adaptation interface so as to be capable of scheduling between said traffic classes in an optimum manner.

Preferably, the scheduler is embodied in software in machine readable form on a storage medium.

BRIEF DESCRIPTION OF THE DRAWINGS

A preferred embodiment of the invention will now be described with reference to the accompanying drawings in which.

DETAILED DESCRIPTION OF PREFERRED EMBODIMENTS

Figure 1:
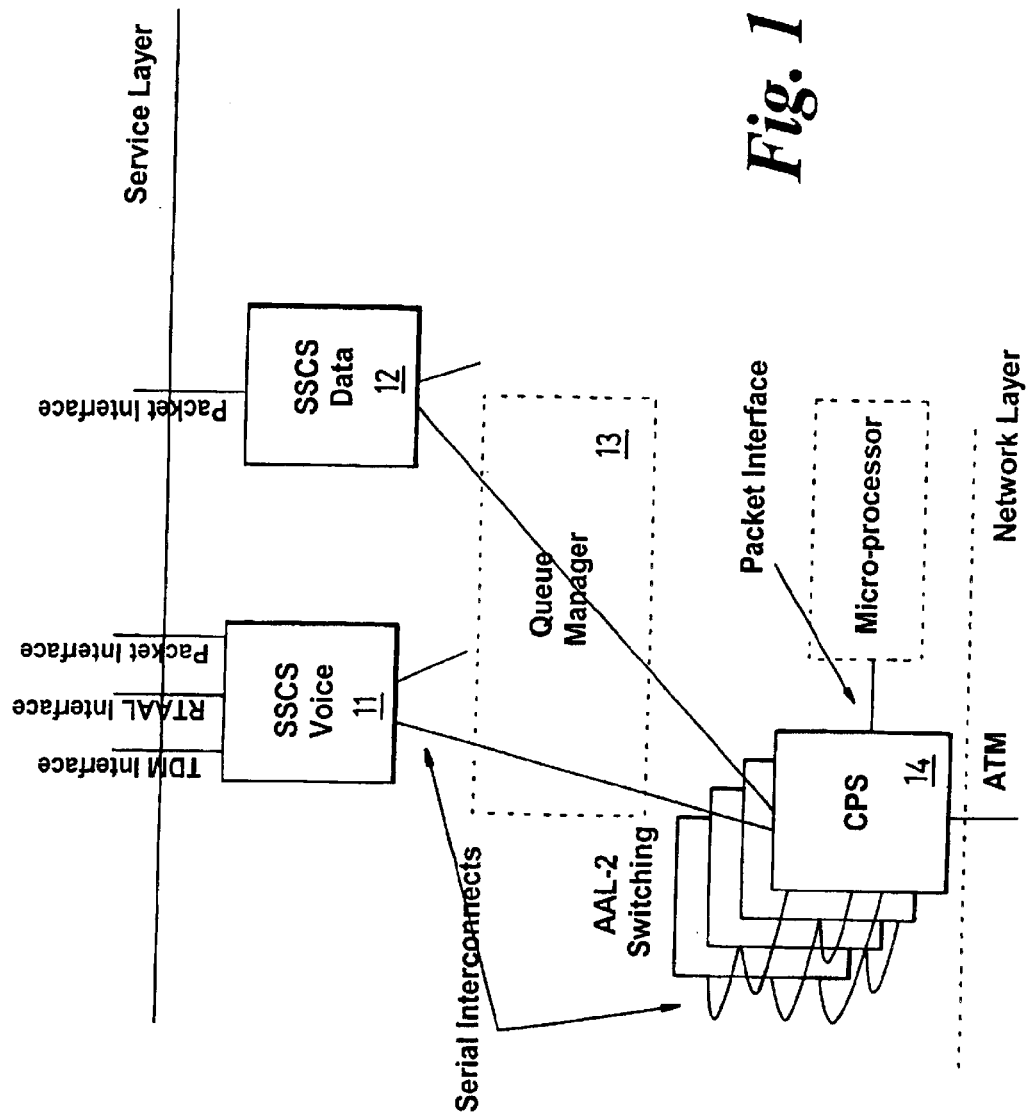
FIG. 1 shows a preferred adaptation layer technology functional partitioning.

As an aid to the understanding of the invention, a preferred adaptation layer functional partitioning will first be described with reference to FIG. 1. FIG. 1 illustrates an exemplary functional partitioning to implement the required ATM adaptation layer technology at an adaptation interface in which traffic from a number of sources is packaged into ATM cells for transport over an ATM network. In this configuration, the adaptation layer technology functionality is partitioned into a number of devices or functional blocks. These comprise a service specific convergence sublayer (SSCS) voice device 11 that provides service layer functions to assemble (and disassemble) delay sensitive traffic (e.g. voice channels) into AAL1 or AAL5 ATM service data units (SDUs) or into AAL2 mini-channel SDUs. Typically, the SSCS voice device has a TDM interface, an RTAAL interface and a packet interface. A service specific convergence sublayer (SSCS) data device 12 provides service layer functions to assemble (and disassemble) non-delay critical traffic (e.g. IP data packets) into either AAL5 ATM SDUs or AAL2 mini-channel SDUs. An optional queue manager device 13 can be used to increase the amount of CDV and PDV compensation that the system can provide, and additionally can be used to increase the traffic shaping and scheduling capability of the system. A common part sublayer (CPS) device 14 performs the functions of ATM header and AAL2 minichannel header assembly (and disassembly) together with the function of multiplexing (and de-multiplexing) the stream of AAL2 layer and ATM layer connections together onto a single physical interface. The arrangement of FIG. 1 thus supports all of the features of the key ATM adaptation layers (AAL1, AAL2 and AAL5) but is not restricted only to those adaptation layers.

The partitioning optimally separates the key functions of the system such that the divergent requirements of voice and data applications can be provided in specialised devices that are unencumbered with the orthogonal functionality necessary to support the other service, yet through the use of a common CPS layer still retains the ability to multiplex voice and data services together onto the same physical ATM link and (for AAL2) within the same VCC connection. The multiplexing and demultiplexing functionality provided by the common part sublayer (CPS) device 14 is the base functionality needed to provide the ability to perform AAL2 switching capability. Thus the partitioning depicted in FIG. 1 enables an AAL2 switching function to be optimally configured in either isolation (through the use of CPS devices) or in combination (using both CPS and SSCS devices). A further advantage of the partitioning of FIG. 1 is the ability to extend the CDV and PDV compensation provided by the SSCS devices through the use of the optional queue manager device 13. This device enables the system to be used in environments where a high level of jitter may be introduced on the connection (typically in low speed access applications) but without encumbering the SSCS devices unduly. It will of course be understood that in the majority of applications where the PDV/CDV is less, the CDV/PDV compensation capability of the SSCS is sufficient to prevent the need to deploy a queue manager.

A feature in the implementation of the architecture of FIG. 1 is the traffic scheduling function which effectively defines the characteristics of the ingress multiplexing processor device. The ingress direction is here defined as the direction of traffic into the ATM network, and the egress direction is defined as the direction of traffic from the ATM network. For an optimum solution such a scheduler must provide the following minimum characteristics:

It schedules traffic so that the delay through the system is minimised.

It has the ability to prioritise the scheduling of traffic according to the class of service.

Within each traffic class fairness is provided between each member.

Has the ability to monitor the current level of traffic within the system and when this becomes excessive has the ability to provide mechanisms whereby the system is able to take preventative actions.

The partitioned architecture of FIG. 1 is designed to support a full range of CBR voice, VBR voice and data services. Each of these services has a different set of source characteristics, for example the cell emission rate and level of 'burstiness'. Traffic scheduling plays an important role within the system to ensure that each service is supported in a fair manner according to its required QoS. To provide this, traffic scheduling occurs at different layers within the system. Typically these are, scheduling within a traffic class, scheduling between the different traffic classes and scheduling at the physical layer.

Prior to a description of an exemplary embodiment of the traffic scheduling apparatus and method, an overview of some key traffic management features (ATM traffic classes, connection admission control, policing and shaping) is provided below as a general aid to understanding.

AAL2 Scheduling Issues

AAL2 introduces a number of new issues to ATM scheduling and congestion control. These arise primarily from the characteristics of the traffic sources that AAL2 has been designed to support.

AAL2 Traffic Sources

AAL2 will be used primarily to support CBR Voice and VBR Voice traffic sources. It is important to note here the distinction between the individual AAL2 traffic sources and the underlying traffic class of the VCC bearer (CBR or rt-VBR VCC). In AAL2 it will be quite normal to use a CBR VCC to aggregate together a number of VBR Voice traffic sources together or to use a rt-VBR VCC to support a mixture of CBR Voice and VBR Voice traffic sources.

A CBR Voice source is characterised by a periodic emission of constant rate data.

CBR Voice sources include traditional 64 kb/s PCM (as typically carried by AAL1) or may arise through the use of constant rate CODECs with no silence suppression or downspeeding facility. CBR Voice sources are well understood and when multiple sources are multiplexed into a single VCC the aggregate will form a well-behaved CBR VCC connection (in an analogous manner to how CBR VCCs can be multiplexed together to form a CBR VPC). Congestion can therefore be prevented primarily through the use of appropriate Connection Admission Control (CAC) procedures.

VBR Voice is the term used to describe a traffic source generated by the use of a variable rate coding scheme and/or the utilisation of silence suppression. Generally, such sources still generate data at fixed periodic intervals, however now at each interval, the amount of data generated (the AAL2 packet payload length) can vary dynamically from packet to packet (down to zero during silent intervals). Such a voice source can therefore be characterised as an on-off source that has a variable bit rate during its on-period (albeit constrained to a small set of pre-defined CODEC rates) and an on-off distribution that is defined by the users talkspurt behaviour. Unfortunately the multiplex of these sources no longer guarantees that the aggregate VCC obeys a well behaved CBR characteristic.

Assuming a nominal 50:50 talkspurt ratio each user spends approximately half their time in speech and the other half in silence. Therefore the mean occupancy on any bearer VCC will be half of that if silence suppression was not performed. However over any short time interval there is also a finite probability that fewer or greater than half the users will be active. These statistical fluctuations about the mean increase inversely with the number of users in the VCC pool. Therefore if the underlying bearer VCC is CBR with a capacity equating to the aggregate mean rate of the users during periods where greater than half the users are active congestion will occur at the AAL2 CPS packet layer. Further due to the talkspurt characteristics, the duration of this congestion will typically be far longer than the normal cell-scale congestion that occurs naturally even when multiplexing pure CBR sources together. Simulations have shown that talkspurt congestion periods of several tens of milliseconds can arise when multiplexing multiple VBR-Voice sources together over low rate CBR VCC bearer connections.

There are a number of mechanisms to compensate for this potential talkspurt congestion. These include:

Use a very rigorous call admission control (CAC) mechanism to minimise the probability of talkspurt congestion occurring. For a VCC multiplexing together a low number of sources this is likely to lead to a poor statistical multiplexing gain (poor loading utilisation on the link).

Minimise talkspurt activity by traffic engineering. As the community of users increases the effects of talkspurt activity diminishes (the statistical fluctuation from the mean is smaller for larger groups of users). Thus by maximising the number of sources in a VCC or by aggregating multiple VCCs into a VPC (and policing at the VPC level not the VCC level) the potential for congestion due to talkspurt activity is minimised.

Accept that congestion will occur and provide sufficiently large buffers (at both source and sink) to compensate for it.

Dynamically down-speed connections during periods of talkspurt congestion. Some (but not all CODECS) can dynamically vary the connection bit-rate between a number of defined rates. (For example an ADPCM connection might select between 32 and 16 kb/s).

Use a rt-VBR traffic contract to enable the VCC cell rate to vary its bandwidth to cater for fluctuations in the aggregate bit rate of the traffic sources.

Minimise congestion by delaying lower priority traffic (i.e delay insensitive) in favour of voice traffic during periods of high talk activity. (The use of prioritisation can potentially occur at both the AAL2 packet layer and the ATM cell layer).

In practice, due to the sheer diversity of network applications for which AAL2 will be used, a combination of all of these methods will be employed (although obviously not at the same time on a single VCC). This places some key requirements on the traffic scheduling function:

The scheduling functions must be provided with sufficient buffering at both the AAL2 and the ATM layer to absorb periods of talkspurt congestion.

The scheduler must have the capability to monitor for the onset of talkspurt congestion. Further dependent on application this monitoring must be either per VCC, per group of VCCs or per device. Detection of congestion must then be used to take appropriate action (typically by flagging to the relevant CODECS that they should immediately down-speed if capable).

Traffic scheduling at the AAL2 layer should have the ability to schedule CPS packets such that the resultant AAL2 bearer VCC connection has either a CBR or a rt-VBR traffic profile.

The scheduler should have the ability to protect non-AAL2 traffic from the effects of talkspurt congestion (this means ensuring that non-AAL2 traffic has a 'fair-share' of both the available bandwidth and the available buffering space and, particularly for AAL1/5 voice traffic, ensuring that the delay through the system does not increase significantly during periods of congestion).

The scheduler should support prioritisation both at the ATM level and at the AAL2 packet level.

Figure 2:
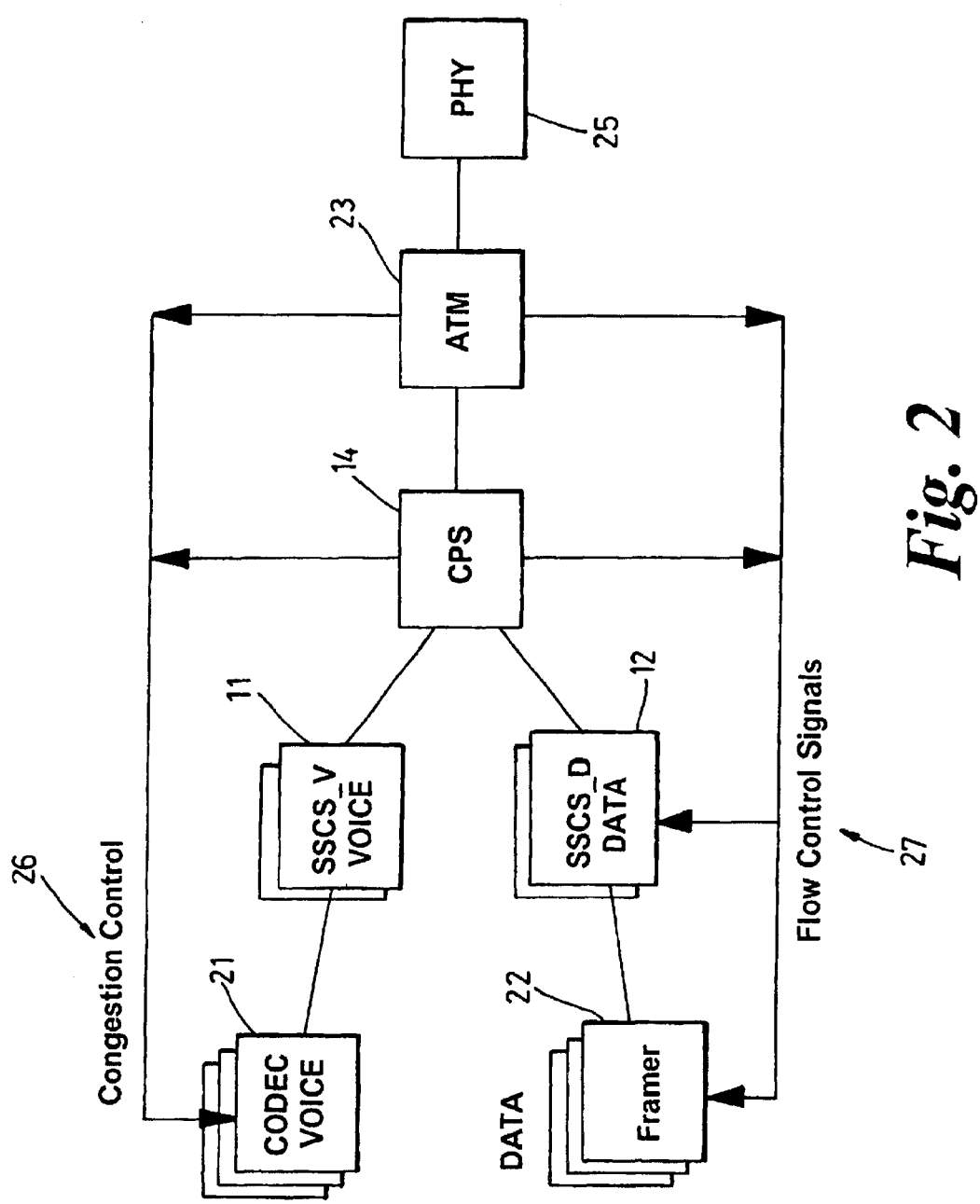
FIG. 2 shows in schematic form a distributed scheduling arrangement according to a preferred embodiment of the invention.

Referring now to FIG. 2, this shows in schematic form a system for providing flexible scheduling and congestion management in the arrangement of FIG. 1 for standard ATM adaptation layers (AALs) in the ingress direction. The scheduler of FIG. 2 is capable of scheduling to any of the commonly supported ATM traffic classes. Further it provides an associated congestion management scheme to monitor for congestion conditions, particularly those that may occur on low-rate CBR AAL2 VCC bearer connections.

As shown in FIG. 2, the scheduler arrangement incorporates a bank of codecs 21 for encoding voice traffic and coupled to the voice SSCS device 11, and a bank of data framers 22 for data traffic and coupled to the data SSCS device 12. The common part sublayer (CPS) device 14 multiplexes data and voice traffic and provides an interface to the ATM layer device 23 and the physical layer device 25. FIG. 2 also illustrates control paths for congestion indication (26) and flow control (27) signals.

At the system level there is a choice as to where the majority of the traffic scheduling functionality is partitioned. Functionality can be implemented either within the CPS layer device 14 or the ATM layer device 23, or distributed across both as illustrated in FIG. 2. In essence, two partitioning options can be considered as follows. In the first option the scheduling and congestion management functionality of the CPS device 14 is minimised and the complex functionality is performed by an appropriate ATM layer device 23. Effectively with this approach, the ingress CPS device operates in a near flow-through manner scheduling traffic for dispatch immediately it is received. The complex scheduling, traffic shaping, buffering and congestion management functions are then performed in the ATM layer device. Effectively, the ATM device 23 reshapes the output of the CPS device 14 to the pre-defined connection traffic contracts.

Alternatively the full scheduling and congestion management functionality can be implemented within the CPS device 14 so that it outputs 'well behaved' shaped connections. The required functionality in the ATM layer device 23 is then minimised.

The first option, i.e. concentrating functionality in the ATM layer device would provide the following advantages:
it minimises the complexity of the ingress CPS scheduling function,
it minimises the CPS congestion monitoring requirements (the CPS only needs to monitor its aggregate congestion level to ensure that its buffers do not overflow—individual connection monitoring is not required),
However such an approach would suffer from two very distinct disadvantages:
It places a greater burden on the requirements of external circuitry which will add to system cost and complexity, and in many applications this is not feasible or available.
All scheduling, shaping and congestion control now only occur at the ATM cell level. It does not support AAL2 packet level prioritisation or QoS controls.
The second option offers the following advantages:
Can operate at both the packet and cell level,
Minimises requirements on the ATM layer device.
However it suffers from the following potential disadvantages:
Increases complexity of scheduling in the CPS (both rt-VBR and CBR scheduling required),
Increases the congestion monitoring requirements in the CPS (per AAL2 VCC congestion measurements are necessary).

We have found that the optimum solution is to provide a hybrid approach to scheduling and congestion monitoring whereby the sufficient functionality required to schedule according to simplified traffic profiles is provided which obviates the need for a mandatory ATM device in many high volume low-cost applications. This does not however preclude the use of an ATM layer device to perform additional buffering, traffic re-shaping and further congestion control for those applications that require it.

Traffic Scheduler Architecture

Scheduler Hierarchies

Figure 3:
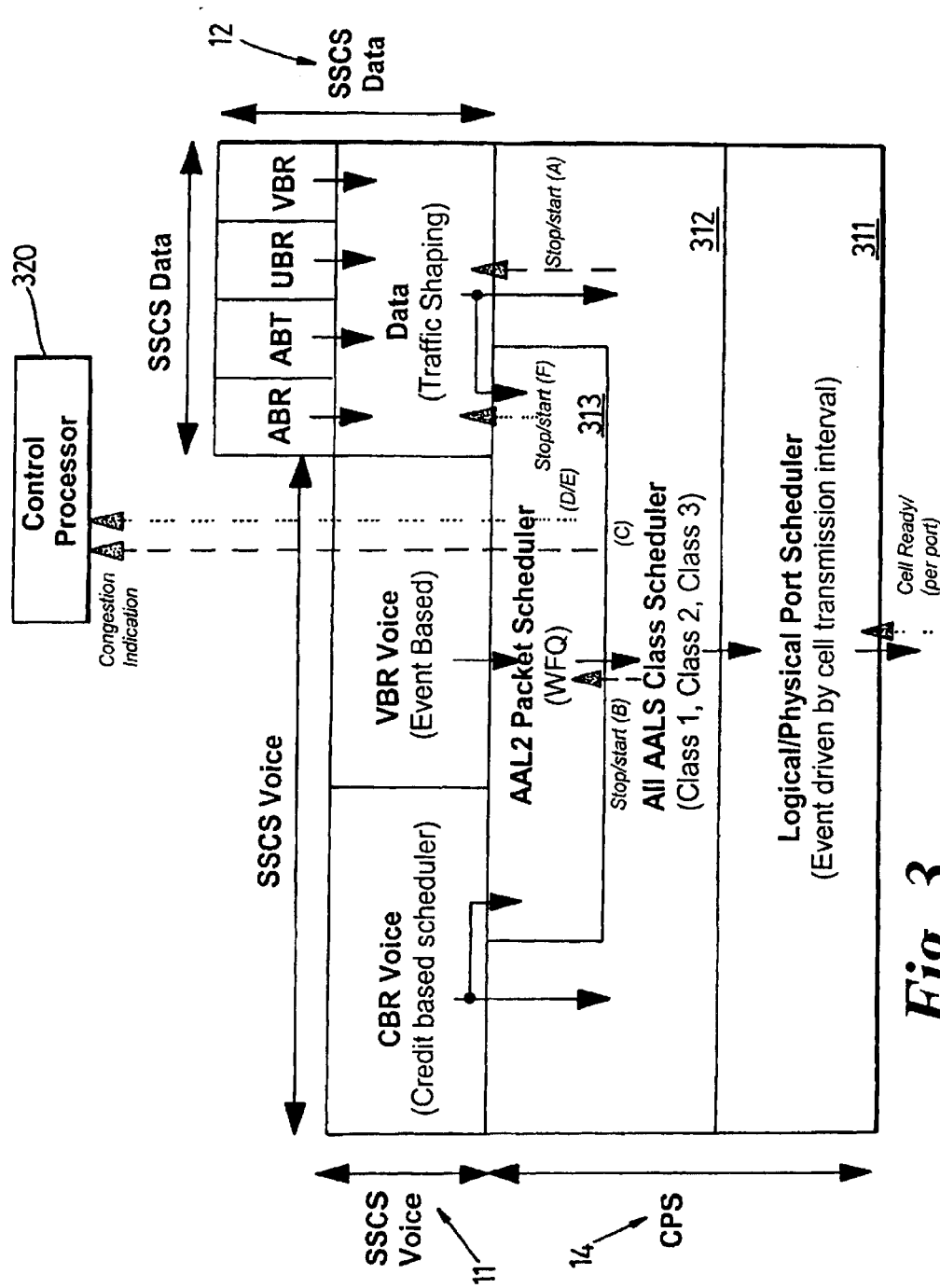
FIG. 3 illustrates an ingress scheduling hierarchy associated with the scheduler of FIG. 2.
Figure 4:
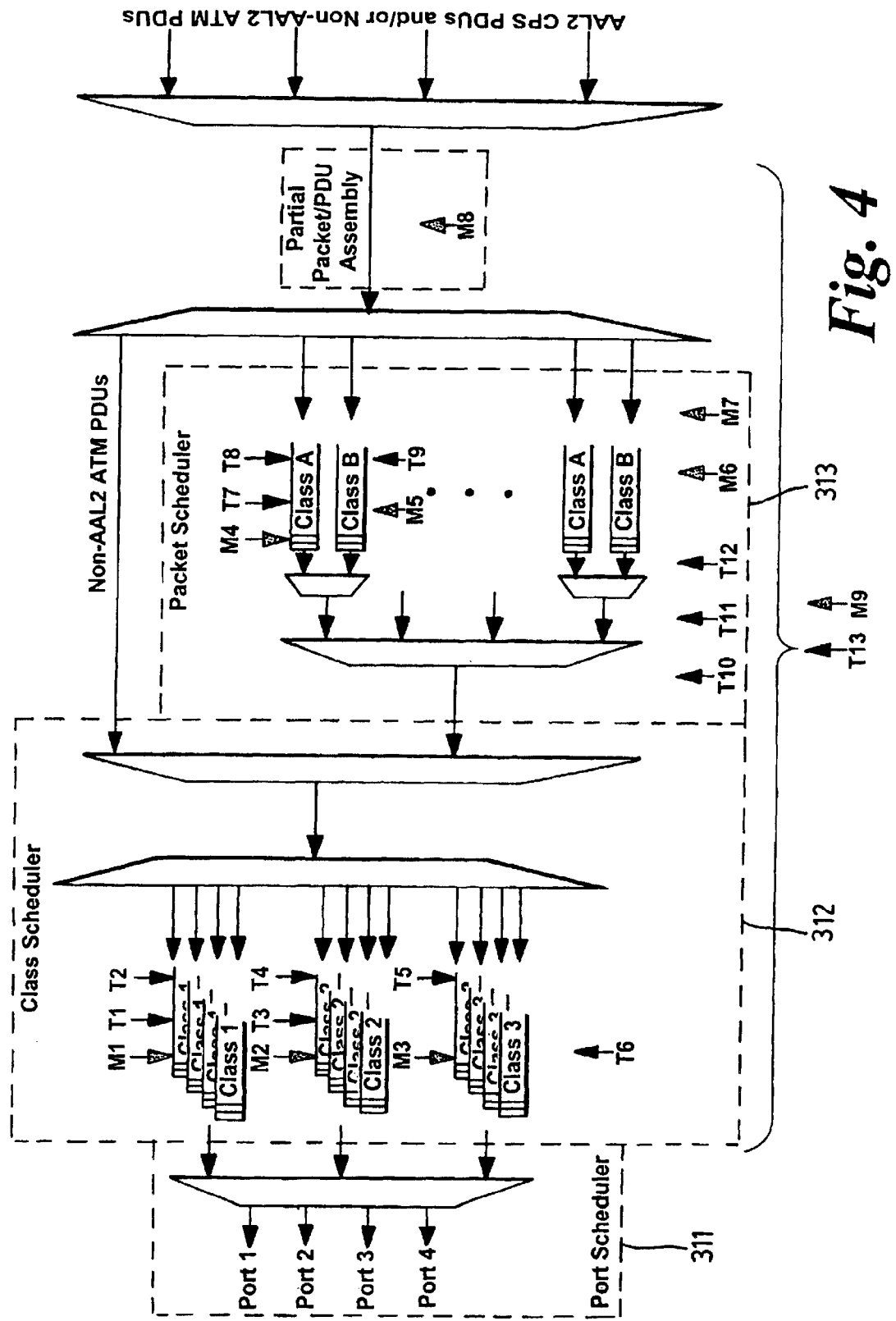
FIG. 4 illustrates a CPS congestion monitor associated with the scheduler of FIG. 2.

The distributed traffic scheduler employed in the scheduling management arrangement of FIG. 3 (and the associated control monitoring functionality) is implemented as a hierarchy of individual traffic schedulers as illustrated schematically in the logical diagram of FIG. 3 and in the functional diagram or flow chart of FIG. 4. At each layer of the hierarchy one or more traffic schedulers operates. Each scheduler is tuned to the respective layer and traffic source characteristics that it supports. The aggregate traffic output at one layer in the hierarchy forms an input to the next layer. Each layer operates in an independent manner with the exception that lower-level layers may provide feedback to higher layers to control the flow of traffic during periods of congestion. We have found that this hierarchical approach has a number of advantages:
simplifies the scheduling algorithm at each layer within the hierarchy,
enables scheduling algorithms to be optimised to support a specific traffic class without burdening other classes with the necessary functionality,
ensures connections and classes are multiplexed together at the appropriate layer,
enables a fair allocation of the available bandwidth and buffering space to be allocated to individual connections and/or traffic classes
enables the scheduler to be distributed across a number of devices; this is especially important to enable the implementation of distributed adaptation technology families.

FIG. 3 shows a top-level diagram of the exemplary hierarchical scheduling process used in the arrangement of FIG. 2. At the lowest level of the hierarchy is the common part sublayer (CPS) device 14. Implemented within this device are all traffic scheduling functions that are common to all traffic services. Thus, traffic schedulers are provided to control the physical layer multiplexing function 311, the ATM layer multiplexing function 312 and the AAL2 multiplexing layer function 313. Above this common part sublayer, service specific traffic scheduling functions are provided either within the SSCS voice device 11 or the SSCS data device 12. A central processor 320 provides management and control.

Whilst in FIG. 3, only one instance of each of the three devices is shown in the interests of clarity, it will of course be understood that the general architecture of the can support systems whereby multiple instances of each device can be cascaded together in order to scale the system.

Logical/Physical Port—Scheduling

At the lowest level of the hierarchy is the physical (or logical) port scheduler 311. Each CPS device is capable of supporting multiple ATM ports (typically four ports as shown by way of example in FIG. 4). The ports may be configured either as separate physical interfaces or as a single physical interface supporting multiple logical ports. The port scheduler 311 is used to control the transmission of completed ATM cells across this interface.

The port scheduler 311 is strictly event driven, and is controlled by the cell transmission opportunities that occur for each port. Typically when multiple ports are provided each port is granted a cell transmission opportunity cyclically on a "round-robin" basis. At each cell transmission interval the logical/physical port scheduler requests a cell from the relevant class scheduler (there is one class scheduler per port) and transmits this cell across the ATM cell interface. As the logical/physical port scheduler is strictly event driven and receives cells one at a time from the relevant class schedulers it does not need any physical storage capability.

Class Scheduling

The class scheduler 312 responds to the availability of a cell transmission event on a particular port. There is one class scheduler per logical or physical port. Each class scheduler is responsible for arbitrating between the different traffic classes supported by the CPS device. Each class scheduler maintains a series of class queues—one queue per traffic class supported by the CPS device 14.

Three traffic classes are supported within the CPS, although those skilled in the art will recognise that the scheduler functionality may be easily extended to support further classes if necessary. These traffic classes are denoted as Class 1, Class 2 and Class 3. The Class 1 queue is designed to support CBR traffic, the Class 2 queue for rt-VBR traffic and the Class 3 queue to support aggregated data traffic, although other traffic permutations are possible. Each per port class scheduler 312 uses strict-sense priority to determine the scheduling of cells between the traffic classes. I.e. for each and every cell transmission opportunity, a particular per port class scheduler will always schedule Class 1 traffic in preference to Class 2 traffic and Class 2 traffic preference to Class 3 traffic. Such scheduling is optimum in that the delay through the system for all delay sensitive traffic is minimised and further, even during periods of 'talkspurt' congestion CBR traffic is unaffected (providing the class queues are used in the manner described above). Note that whilst strict sense priority is thus favoured, other priority scheduling mechanisms, such as weighted fair queuing could be implemented within the class schedulers.

Within each traffic class queue, cells are queued by the class scheduler in the order that they are received and hence the queued cells are dispatched in that order. Thus the class schedulers each maintain per class per port queues as indicated in FIG. 4. Although logically each of the per port class schedulers operates fully independently, a single common buffer storage area may be used to provide the necessary queuing capability. Linked list or similar control mechanisms may be used to implement the individual per port per traffic class queues such that the total common buffer area may be dynamically shared between ports and traffic classes in accordance to the current traffic distribution. The provision of the queues in such a manner is optimum in terms of memory utilisation.

AAL2 Packet Scheduler

The function of the packet scheduler 313 is to control the scheduling of AAL2 packets to form completed ATM protocol data units (PDUs). The AAL2 packets will either be received from the SSCS data and/or voice devices, when in trunking mode, to perform the function of TDM to ATM adaptation) or directly from the egress CPS function (either of the same device or an interconnected CPS device) when performing an AAL2 adaptation switching function. The completed AAL2 ATM PDUs are in turn dispatched by the packet scheduler to the appropriate class scheduler at the next level within the hierarchy.

All AAL2 VCCs are treated equally by the packet scheduler. Thus, each VCC will be serviced in a weighted manner according to the relative bandwidths of the underlying bearer VCC. Per VCC, the packet scheduler 313 schedules the dispatch of AAL2 packets, and thus the generation of ATM payloads, according to the traffic contract of the bearer (either CBR or rt-VBR VCC traffic contracts are supported by the CPS). Logically therefore, there is one packet scheduler per AAL2 VCC. Each packet scheduler supports a minimum of two priorities—Priority A (typically used for delay sensitive traffic) and Priority B (typically used for delay insensitive traffic). The packet scheduler thus maintains per VCC per priority queues of unscheduled AAL2 packets. Strict sense priority is used to schedule packets within an AAL2 packet scheduler to minimise the scheduling delay for delay sensitive traffic. Again, whilst maintaining logically separate per VCC per priority queues, the packet scheduler queues are implemented using a single common memory. Linked lists or similar control structures may be used to enable the common memory to be dynamically partitioned to support the necessary multiple queues. The CPS supports any precise implementation of packet scheduler algorithm providing it meets the above described general requirements.

Service Specific Scheduling

At the next level of the scheduling hierarchy are the service specific traffic schedulers 320, 321, 331. As their name implies these schedulers are tailored individually to schedule traffic to match the service that they support. Therefore, both the input to and the operation of these schedulers will be service specific. However, all service specific schedulers schedule traffic in such a manner such that its output appears as a well-behaved traffic source to the next (lower) level hierarchy of the scheduler architecture (either the packet scheduler for AAL2 packets) or the class schedulers for ATM PDUs. In this context, well-behaved implies that the aggregate traffic streams will have minimal jitter or burst characteristics thus in turn minimising the potential for congestion at the next (lower) level in the traffic hierarchy.

The scheduler arrangement supports at least (but is in no way limited to) two types of SSCS devices—the SSCS Voice device and the SSCS data device Examples of the service specific scheduling functions provided in each these devices are discussed below.

SSCS Voice Scheduling

The SSCS voice device 11 generates packet data (either AAL2 packets or ATM PDUs) from voice samples generated by a suitable traffic source. It supports two distinct types of voice traffic—CBR voice (constant bit rate no silence suppression) and VBR voice (dynamic compression rates and/or silence suppression).

CBR voice traffic is typically generated from synchronous voice frames (typically SDH or PDH data frames). At each frame (125 us for 64 kb/s PCM) each voice channel generates one sample (one octet for PCM) of data. The voice device collects sufficient voice samples (either from a single voice channel or multiple channels) to complete a packet (AAL2 or ATM PDU) and under control of the CBR voice scheduling function 320 transmits the completed packets to the CPS device. The voice scheduling algorithm ensures that the resultant aggregate traffic stream (from the sum of all such voice services) appears in itself as near to a CBR source as possible. This is achieved by ensuring that the dispatch of completed packets are substantially randomly distributed both across the periodic voice sample interval (125 us for PCM) and across the packet assembly interval (5.875 ms for AAL1 cells containing forty seven successive voice samples from a single source). Since the aggregate output of the CBR voice scheduler 320 is in itself a constant bit rate source it will not cause congestion when transmitted to the next (lower level) scheduler within the hierarchy.

VBR voice data is typically generated by a DSP/CODEC that supports one or a number of voice compression algorithms (for example ADPCM, LD-CELP. Typically the CODEC is configured such that it transmits data to the SSCS in a packetised format i.e. the SSCS does not need to packetise the voice samples itself it merely needs to generate the appropriate control information necessary to form the packet header. In a preferred architecture, the SSCS voice devic acts in flow-through mode for this traffic type and there is therefore no active scheduling function within the SSCS voice device. This ensures that delay through the system is minimised for packetised voice traffic. To minimise potential congestion conditions within the CPS at connection setup—the packet generation phase of each of these traffic sources is randomised (with respect to other such sources). Whilst this minimises the potential for phase-level congestion in the CPS 14 it cannot fully mitigate the potential for talkspurt congestion, which by its nature may typically last for many hundreds of milliseconds. As will be described below the CPS therefore contains mechanisms for detecting and handling such conditions.

SSCS Data Scheduling

Data traffic is inherently bursty in nature and therefore large instantaneous queues may occur when multiplexing data traffic together. To prevent this burstiness causing congestion in the CPS device the majority of the data scheduling capability is distributed into the SSCS Data device 12.

The SSCS data device 12 uses a two level scheduling hierarchy. At the lower level 331 are the aggregate data schedulers. Logically there is one aggregate data scheduler per device to which the SSCS data device is connected. Normally therefore there is one scheduler for each of the CPS devices to which the data device is interconnected. The task of each aggregate data scheduler is to arbitrate between the traffic generated at the next level in the hierarchy, i.e. the data class schedulers, such that the output of the aggregate data scheduler is nominally a constant rate (and shaped) data stream. The rate of the stream is configured according to the current load of the connected CPS switch such that under the majority of conditions the data traffic never causes congestion at the CPS device. As will be described further below, a flow control mechanism asserted by the CPS device 14 can be used to temporarily halt the transmission of data from the aggregate data schedulers.

The aggregate data schedulers arbitrate between the data class schedulers at the next level of the hierarchy. Typically the SSCS data device aggregate data scheduler will use either a weighted fair queuing or a statistical priority queuing mechanism to select between the differing data class buffers. In the former case each class queue gets equal access to the scheduler albeit in direct proportion to its mean data rate whilst in the latter case class queues are assigned a statistical priority level whereby one queue is generally prioritised over another albeit the lower priority queue is still granted the scheduler in preference to the higher priority queue according to a user configured statistical priority (this mechanism enables one queue to be prioritised over another but even during periods of significant data bursts still ensures that each queue gains some access to the scheduler.

For data traffic the highest level of the scheduler is therefore the individual data class schedulers 332 . . . 335. Each of these schedulers is defined to provide the optimum scheduling function for a particular data class (e.g. ABR, ABT, VBR etc.) and will arbitrate between the individual connections within each class according to its specified algorithm. Since each data class scheduler is specific to the service that it supports the amount of queue buffering required can also be tailored to match the individual traffic class.

Congestion Monitoring/Avoidance Mechanisms

The arrangement of FIGS. 3 and 4 in general, and the CPS device in particular, provides flexible features to enable ingress congestion conditions to be monitored, detected and appropriate avoidance mechanisms to be undertaken. These dynamic mechanisms (described below) when used in conjunction with appropriate traffic engineering rules (especially CAC) ensure that the system operates in the optimum manner to minimise the effects of congestion (and in particular potential talkspurt congestion).

The CPS device 14 is designed to support a wide mixture of both traffic mixes, and also operates in a number of potential modes. In particular it is designed to support both a trunking application (whereby in conjunction with appropriately connected SSCS and CODEC devices it performs the function of TDM to ATM adaptation) and AAL2 switching (via direct interconnection to other CPS devices). From a traffic congestion perspective there are distinct differences between these two modes of operation. In a trunking application the CPS device 14 will typically be co-located with any CODECs 21 that generate the packetised VBR voice traffic sources often used in AAL2—provided the CODEC supports dynamic voice compression (down-speeding) it is therefore often possible to prevent congestion occurring providing the relevant CODECs are instructed to down-speed (i.e. increase the voice compression rate) prior to a severe congestion situation occurring. In AAL2 switching applications however, the CPS will not typically be co-located to the packetised voice sources and therefore (due to the round-trip delay involved) cannot initiate down-speeding in order to alleviate potential congestion conditions. In this application therefore not only must more stringent traffic engineering be used in order to minimise the potential occurrence of such conditions but equally the CPS must have a strategy to operate during these periods. Essentially this means having the ability to selectively discard cells/packets under extreme congestion conditions.

The congestion monitoring and avoidance mechanisms employed within the CPS are sufficiently flexible to enable the CPS to operate efficiently in either application. The CPS uses a series of monitors and thresholds to implement its traffic congestion mechanisms algorithms. Monitors are provided to measure queue lengths at key points within the CPS scheduling hierarchy. This information can be polled by the control processor 320 to enable it to monitor congestion and system utilisation. This information can be used to support its CAC procedures. All CPS monitors are implemented as 'high water marks' that record the maximum queue since the last time the monitor was polled by the control processor (at which point the water mark is reset). In contrast thresholds are used to define (typically user configurable) limits for the key scheduler queues which if reached cause the CPS to perform an active congestion handling mechanism.

Exemplary monitors and thresholds implemented within the CPS device are illustrated in the schematic diagram of FIG. 4 and are summarised in Table 1 and Table 2 below.

TABLE 1

Thresholds

| ID | Type | Measurement | Action | Purpose |
|---|---|---|---|---|
| T1 | User set | Class 1 Queue Size (Number of slots aggregated across all four ports) | Raise Alarm | Enables controller to activate global downspeeding in trunking operations |
| T2 | User set T1 < T2 | Class 1 Queue Size (Number of slots aggregated across all four ports) | Raise alarm, discard further Class 1 non-AAL2 PDUs, stop packet scheduler | Prevents Class 1 queue from growing out of bounds |

TABLE 1-continued

Thresholds

| ID | Type | Measurement | Action | Purpose |
|---|---|---|---|---|
| T3 | User set | Class 1 Queue Size (Number of slots aggregated across all four ports) | Raise alarm | Enables controller to activate global downspeeding in trunking operations |
| T4 | User set T3 < T4 | Class 1 Queue Size (Number of slots aggregated across all four ports) | Raise alarm, discard further Class 2 non-AAL2 PDUs, stop packet scheduler | Prevents Class 2 queue from growing out of bounds |
| T5 | User set | Class 1 Queue Size (Number of slots aggregated across all four ports) | Raise alarm, assert stop data flow control signal, discard further Class 3 packets received | Prevents Class 3 queue from growing out of bounds |
| T6 | Fixed 1K | Class1 + Class2 + Class3 (Number of slots aggregated across all four ports) | Raise alarm, assert flow control, discard further non-AAL2 packets, stop packet scheduler | Mechanism applied when class control memory is full |
| T7 | User set | Priority A packet queue (Unscheduled octets per AAL2 VCC) | Raise alarm | Enables selective downspeeding to be initiated in trunking operations |
| T8 | User set T7 < T8 | Priority A packet queue (Unscheduled octets per AAL2 VCC) | Raise alarm and discard further packets for that queue | Prevents any packet queue from growing out of bounds |
| T9 | User set | Priority A packet queue (Unscheduled octets per AAL2 VCC) | Raise alarm and discard further packets for that queue | Prevents any packet queue from growing out of bounds |
| T10 | User set | Priority A packet queue (Total of packets across all AAL2 VCCs) | Raise alarm | Enables controller to activate global downspeeding in trunking operations |
| T11 | User set T10 < T11 | Priority A packet queue (Total of packets across all AAL2 VCCs) | Raise alarm and discard further Priority A packets | Prevents Priority A packet queues from growing out of bounds in global congestion situation |
| T12 | User set | Priority B packet queue (Total of packets across all AAL2 VCCs) | Raise alarm, assert flow control and discard further Priority B packets | Prevents Priority B packet queues from growing out of bounds in global congestion situation |
| T13 | Fixed | Sum of all memory slots in use | Raise alarm, assert flow control and discard any received cells/packets | Mechanism applied when external memory becomes full |

TABLE 2

Monitors

| ID | Measurement | Purpose |
|---|---|---|
| M1 | Class 1 Queue Size (Number of slots aggregated across all four ports) | Provides mechanism to monitor size of Class 1 queue |
| M2 | Class 2 Queue Size (Number of slots aggregated across all four ports) | Provides mechanism to monitor size of Class 1 queue |

TABLE 2-continued

Monitors

| ID | Measurement | Purpose |
|---|---|---|
| M3 | Class 3 Queue Size (Number of slots aggregated across all four ports) | Provides mechanism to monitor size of Class 3 queue |
| M4 | Priority A packet queue (Unscheduled octets per AAL2 VCC) | Provides mechanism to monitor size of Priority A traffic |
| M5 | Priority B packet queue (Unscheduled octets per AAL2 VCC) | Provides mechanism to monitor size of Priority B traffic |
| M6 | Priority A packet queue (Unscheduled octets per AAL2 VCC) | Mechanism to track number of Priority A packets in system |
| M7 | Priority B packet queue (Unscheduled octets per AAL2 VCC) | Mechanism to track number of Priority B packets in system |
| M8 | Number of partial slots | Optional monitor primarily for fault detection |
| M9 | Total slots in use | Monitors total system congestion |

The congestion monitoring/avoidance mechanisms at each level in the scheduling hierarchy are now described below in further detail.

Logical/Physical Port—Congestion Monitoring

Since the logical/physical port scheduler is strictly event driven and receives cells one at a time from the relevant class schedulers congestion will never occur at this level of the scheduling hierarchy and therefore no congestion monitoring capability need be provided.

Class Scheduler Congestion Monitoring

Congestion monitoring capability is provided within the class scheduler 312. Low-level congestion monitoring is performed by the CPS device 14, and this information is provided to the control processor 337 (FIG. 3) to enable it to perform general control functions such as load monitoring and connection admission control. The low-level monitoring functions within the class schedulers monitor the following items:

M1—The sum (across all ports) of the Class 1 queue traffic currently stored within the class scheduler queues.
M2—The sum (across all ports) of the Class 2 traffic currently stored within the class scheduler queues.
M3—The sum (across all ports) of the Class 3 traffic currently stored within the class scheduler queues.

Whilst per-port, the class schedulers operate independently the congestion monitoring is implemented across the aggregate queues since they share a common buffer storage area. Each of these monitors is implemented as a "high watermark" that records the maximum size that each of the aggregated queues has reached since the monitor was last polled by the control processor, at which point the watermark is reset.

In addition to the low-level congestion monitoring the class schedulers also provide mechanisms that are capable of reacting instantaneously to pre-defined congestion levels in order to throttle back on new data entering the class scheduler during these periods of congestion. An active mechanism such as this is critical to prevent potential instantaneous congestion levels within the class schedulers causing excessive cell loss due to buffer overflow. The active congestion mechanisms are controlled by five programmable thresholds (set by the user via the control processor) T1 to T5 plus a sixth fixed threshold T6. The actions taken by the CPS for each of the thresholds is described below:

If the Class 1 aggregate queue length exceeds T1 an alarm is raised to the control processor. This threshold can be used to indicate impending potential device level congestion to the control processor such that it may initiate preventative action. Typically such preventative action is to initiate down-speeding of all connected capable CODECs such that the amount of voice compression increases thereby decreasing the overall cell arrival rate. As has already been stated in the majority of switching applications such avoidance mechanisms may not be possible and therefore the alarm generated by T1 is maskable and can therefore be disabled if not required (similarly T3). Further in trunking applications, if the Class 1 queue is used purely for CBR VCCs such talkspurt congestion should never occur in the Class 1 queue and again the user may wish to disable this alarm.

T2 sets the maximum length that the aggregate Class 1 queue may grow to and therefore provides the user with a mechanism to place an upper bound on this queue, therefore guaranteeing buffer space for the Class 2 and Class 3 queues. If T2 is exceeded, then a further alarm will be generated and, whilst the threshold is exceeded, all further Class 1 non-AAL2 ATM PDUs received will be discarded. Additionally a global stop signal (stop/startI B on FIG. 3) is applied to the packet scheduler 312 to temporarily halt it scheduling any further AAL2 ATM PDUs during the congestion condition. Halting the packet scheduler in this manner is preferred over discarding AAL2 ATM PDUs since it minimises packet loss and simplifies implementation of the queues. In theory during a Class 1 congestion condition only Class 1 AAL2 ATM VCCs should halt completely halting the packet scheduler is a further useful implementation simplification that has little impact on overall performance since if the thresholds are properly set this condition should be rarely encountered.

T3 and T4 operate identically to T1 and T2 but cover the aggregate class 2 queues.

T5 defines the maximum size for the Class 3 queue. Typically the Class 3 queue is used to aggregate all received data traffic. If the T5 limit is reached then an alarm will be raised, a 'stop-data' flow control signal will be asserted to all interconnected devices (stop/start A on FIG. 3) and any further received Class 3 data PDUs received during this congestion condition will be discarded. Whilst applied, the flow control signal ensures that all capable devices temporarily halt the transmission of data PDUs to the congested CPS device. Due to the bursty behaviour of data traffic, these devices will typically be configured with large queue buffers and are therefore capable of absorbing the additional queue demands during the periods of congestion without causing excessive cell loss. The loss of any further received PDUs ensures the Class 3 queue does not exceed its maximum length in those applications where it is not possible to halt transmission of data PDUs using the flow control mechanism.

T6 is a fixed threshold set equal to the total size of the common memory Class scheduler queue. If the total number of PDUs across all ports and all classes reaches this limit then again an alarm will be raised and during the congestion condition both the 'stop-data' flow control signal and the packet scheduler will be halted. Any received PDUs received during this period must of course be discarded.

The congestion avoidance mechanism described is optimum for the following reasons:
No queue can grow out-of bounds thus ensuring all Class queues have a share of the available buffer storage area.
Can be configured flexibly to support a wide range of switching and trunking modes.
Is simple to implement.
Where appropriate minimises packet/cell loss by either initiating downspeeding or temporarily buffering traffic elsewhere in the scheduling hierarchy (either packet scheduler or SSCS data devices).

Packet Scheduler—Congestion Monitoring

Congestion monitoring capability is provided within the packet scheduler 313. Again, as the class scheduler 312, both low level congestion monitoring and active congestion handling mechanisms are provided. However within the packet scheduler congestion monitoring/handling is performed both at the aggregate or device level and at the individual packet scheduler level (i.e. for each individual AAL2 VCC bearer). Aggregate level congestion monitoring is required to guard against the possibility of device overloading which may occur if a large number of AAL2 VCCs simultaneously experience a talkspurt congestion condition, whilst the individual packet scheduler level monitoring is required since even if overall the device is lightly loaded an individual AAL2 VCC may be experiencing a severe overload condition. This will typically occur due to talkspurt congestion especially for CBR VCCs. Generally if the bearer is a rt-VBR VCC the cell scheduling emission can simply increase to accommodate the burst).

AAL2 packets are of variable length and therefore in terms of scheduler throughput (i.e. the number of ATM payload octets consumed) two 10 octet packets represent the same amount of data as a single 20 octet packet. Therefore to ensure maximum accuracy in detection, the individual AAL2 VCC congestion monitors and thresholds are measured and specified in terms of the total number of unscheduled AAL2 octets (including payload and headers) in a queue. At the device level the congestion monitoring is measured in terms of packets. This is because the CPS packet scheduler buffer is implemented as a single common memory divided into slots whereby one slot stores one packet irrespective of packet size. Therefore a small packet consumes as much device resource as a large packet.

At the aggregate level the total number of packets in the scheduler for each AAL2 traffic priority is monitored i.e. M6 is used to monitor the Priority A packets, M7 is used to monitor the Priority B packets. In addition M9 is used to monitor the total number of memory slots in use within the CPS device. Dynamic congestion handling is implemented via thresholds T10 through T13.

T10 is a user configurable threshold. If the total number of Priority A packets exceeds this limit an alarm may be raised. This mechanism is typically used in trunking applications by the control processor to initiate downspeeding of capable CODECs. Again its use will depend on application and it can therefore be disabled.

T11 is a user configurable threshold. It is used to place an upper bound on the total number of Priority A packets in the device—whilst this threshold is reached further received Priority A packets are discarded.

T12 is a user configurable threshold. It is used to place an upper bound on the total number of Priority B packets in the device. If this threshold is crossed an alarm is raised, the 'stop-data' flow control signal (stop/start F on FIG. 3) is raised and any further received Priority B packets during the congestion condition are dropped. The requirement to provide both a flow control signal and a packet discard mechanism is identical to the reasoning for the similar mechanism adopted of the Class 3 congestion control system.

T13 - is a fixed threshold equal to the total memory buffer size. If the total number of used memory slots in the system reaches this figure then an alarm is raised, the 'stop-data' flow control asserted and any further data units received will be dropped.

For the individual AAL2 per VCC packet schedulers the number of unscheduled octets (header plus payload) in each of the priority queues is monitored (via per VCC M4 and M5 monitors). In addition user configurable per VCC thresholds T7, T8 and T9 are used to initiate congestion handling mechanisms. T7 is used to set a threshold on the Priority A queue which when reached causes the CPS device to raise an alarm (indicating which VCC it has occurred on). In trunking applications this may be used by the control processor to initiate selected downspeeding on those (capable) CODECS that act-as traffic sources to the particular (congested) VCC. In switching applications (or trunking applications where downspeeding is not possible) this alarm can be discarded on a per VCC basis. T8 is used to set an upper bound on the total queue length of the Priority A queue—if this threshold is exceeded then subsequent packets for that queue will be dropped. T9 provides a similar mechanism to T8 but for the Priority B queues.

It will be understood that the above description of preferred embodiments is given by way of example only and that various modifications may be made by those skilled in the art without departing from the spirit and scope of the invention.

What is claimed is:

1. A traffic scheduler system for controlling despatch of assembled packets to an asynchronous transfer mode (ATM) network, comprises:
    at least two service specific convergence sublayer (SSCS) devices for processing a plurality of different ATM traffic classes;
    a common part sublayer (CPS) device common to said at least two SSCS devices for multiplexing traffic from said SSCS devices and providing an interface to an ATM network layer device;
    wherein the traffic scheduler system includes a hierarchy of layers of individual traffic schedulers distributed through at least the common CPS device, each individual scheduler being tuned to its respective layer and traffic source characteristics, and wherein an aggregate traffic output from one layer of individual traffic schedulers forms an input to a lower layer of individual traffic schedulers.

2. A traffic scheduler system as claimed in claim 1, wherein the at least two SSCS devices comprise a first SSCS device for processing delay sensitive traffic and a second SSCS device for processing delay insensitive traffic.

3. A traffic scheduler system as claimed in claim 2, wherein the first SSCS device comprises a SSCS voice device for processing voice traffic into at least one of ATM adaptation layer (AAL) 1 service data units (SDUs), AAL5 SDUs and AAL2 mini-channel SDUs.

4. A traffic scheduler system as claimed in claim 2, wherein the second SSCS device comprises a SSCS data device for processing data traffic into at least one of AAL5 SDUs and AAL5 mini-channel SDUs.

5. A traffic scheduler system as claimed in claim 1, wherein it includes a queue manager for managing traffic from the SSCS devices prior to said traffic being forwarded to said common CPS device.

6. A traffic scheduler system as claimed in claim 3, wherein it includes at least one codec coupled to the SSCS voice device for encoding voice traffic in an ingress traffic direction.

7. A traffic scheduler system as claimed in claim 4, wherein it includes at least one data framer coupled to the SSCS data device for framing data traffic received at the SSCS data device in an ingress traffic direction.

8. A traffic scheduler system as claimed in claim 1, wherein the hierarchy of layers of individual traffic schedulers is distributed through at least the common CPS device and at least one of the SSCS devices.

9. A traffic scheduler system as claimed in claim 1, wherein each layer of individual traffic schedulers is arranged to operate independently of the other layers with the exception that at least one lower layer level has a feedback connection to a higher level layer by which it provides feedback to said higher level layer to control the flow of traffic during periods of congestion.

10. A traffic scheduler system as claimed in claim 1, wherein the individual traffic schedulers distributed in a hierarchy of layers through the common CPS device comprise at a lowest layer at least one physical port scheduler, at a next higher layer a plurality of traffic class schedulers and at a next higher layer at least one AAL2 packet scheduler, said traffic schedulers of these layers being common to all classes of traffic.

11. A traffic scheduler system as claimed in claim 10, wherein said plurality of traffic class schedulers comprise a constant bit rate (CBR) traffic scheduler, a real time variable bit rate (rt-VBR) traffic scheduler and an aggregated data traffic scheduler.

12. A traffic scheduler system as claimed in claim 10, wherein the individual traffic schedulers distributed in a hierarchy of layers through the SSCS devices comprise a CBR voice scheduler, a rt-VBR voice scheduler and a SSCS data scheduler.

13. A traffic scheduler system as claimed in claim 12, wherein the SSCS data scheduler comprises a lower level of data schedulers and an upper level of data schedulers.

14. A traffic scheduler system as claimed in claim 10, wherein the individual traffic schedulers of at least one of the CPS traffic class scheduler layer and the CPS AAL2 packet scheduler layer includes a congestion monitor for determining the length of traffic queues.

15. A traffic scheduler system as claimed in claim wherein the individual traffic schedulers of at least one of the CPS traffic class scheduler layer and the CPS AAL2 packet scheduler includes a control means for discarding packets when a congestion monitor determines that a traffic queue exceeds a predetermined length.

16. A method of scheduling despatch of queued assembled packets to an asynchronous transfer mode (ATM) network, comprising:
    processing different classes of traffic at at least two service specific convergence sublayer (SSCS) devices;
    multiplexing traffic from said SSCS devices at a common part sublayer (CPS) device common to said SSCS devices;
    sending said multiplexed traffic to an ATM network layer device;
    wherein the method includes scheduling each class of assembled ATM traffic individually via a hierarchy of layers of individual traffic schedulers distributed through at least the common CPS device, each individual scheduler being tuned to its respective layer and traffic source characteristics, and wherein an aggregate traffic output from one layer of individual traffic schedulers forms an input to a lower layer of individual traffic schedulers.

17. A method as claimed in claim 15, wherein the step of processing different classes of traffic at at least two service specific convergence sublayer (SSCS) devices comprises processing delay sensitive traffic at a first service specific convergence sublayer (SSCS) device and processing delay insensitive traffic at a second SSCS device.

18. A method as claimed in claim 17, wherein the first SSCS device comprises a SSCS voice device and the step of processing delay sensitive traffic comprises processing voice traffic into at least one of ATM adaptation layer (AAL) 1 service data units (SDUs), AAL5 SDUs and AAL2 mini-channel SDUs.

19. A method as claimed in claim 17, wherein the second SSCS device comprises a SSCS data device and the step of processing delay insensitive traffic comprises processing data traffic into at least one of AAL5 SDUs and AAL5 mini-channel SDUs.

20. A method as claimed in claim 16, wherein it managing traffic from the SSCS devices prior to said traffic being forwarded to said common CPS device.

21. A method as claimed in claim 16, wherein the step of scheduling each class of assembled ATM traffic individually via a distributed hierarchy of layers of individual traffic schedulers comprises scheduling said classes of traffic through a hierarchy of layers of individual traffic schedulers distributed through at least the common CPS device and at least one of the SSCS devices.

22. A method as claimed in claim 16, wherein each layer of individual traffic schedulers is operated independently of the other layers with the exception that at least one lower layer level provides feedback to a higher level layer by which said higher level layer controls the flow of traffic during periods of congestion.

23. A method as claimed in claim 16, wherein it includes monitoring congestion of traffic queues at the individual traffic schedulers of at least one of the CPS traffic class scheduler layer and the CPS AAL2 packet scheduler layer.

24. A method as claimed in claim 23, wherein it includes discarding packets at at least one of the CPS traffic class scheduler layer and the CPS AAL2 packet scheduler when a congestion monitor determines that a traffic queue exceeds a predetermined length.

25. A computer program stored on a machine readable medium, said program bppeing executable to implement the method of scheduling despatch of queued assembled packets to an asynchronous transfer mode (ATM) network, the program comprising:

code for processing different classes of traffic at at least two service specific convergence sublayer (SSCS) devices;

code for multiplexing traffic from said SSCS devices at a common part sublayer (CPS) device common to said SSCS devices;

code for sending said multiplexed traffic to an ATM network layer device;

wherein the program includes code for scheduling each class of assembled ATM traffic individually via a hierarchy of layers of individual traffic schedulers distributed through at least the common CPS device, each individual scheduler being tuned to its respective layer and traffic source characteristics, and wherein an aggregate traffic output from one layer of individual traffic schedulers forms an input to a lower layer of individual traffic.

* * * * *